United States Patent
Murarotto

(10) Patent No.: US 10,138,079 B2
(45) Date of Patent: Nov. 27, 2018

(54) APPLIANCE FOR HANDLING LAYERS OF PALLETIZED PRODUCTS

(75) Inventor: Emilio Murarotto, Viano (IT)

(73) Assignee: BEMA S.R.L., Viano (Reggio Emilia) (IT)

(*) Notice: Subject to any disclaimer, the term of this patent is extended or adjusted under 35 U.S.C. 154(b) by 209 days.

(21) Appl. No.: 13/810,577

(22) PCT Filed: Apr. 22, 2011

(86) PCT No.: PCT/IB2011/051768
§ 371 (c)(1),
(2), (4) Date: Mar. 25, 2013

(87) PCT Pub. No.: WO2012/007853
PCT Pub. Date: Jan. 19, 2012

(65) Prior Publication Data
US 2013/0177380 A1    Jul. 11, 2013

(30) Foreign Application Priority Data
Jul. 16, 2010    (IT) .............................. MO2010A0208

(51) Int. Cl.
*B65G 59/04*    (2006.01)
*B65G 47/90*    (2006.01)
(Continued)

(52) U.S. Cl.
CPC ............. *B65G 59/04* (2013.01); *B65G 47/90* (2013.01); *B65G 47/91* (2013.01); *B65G 57/24* (2013.01); *B65G 61/00* (2013.01); *B66C 1/0218* (2013.01)

(58) Field of Classification Search
CPC ........ B65G 61/00; B65G 57/22; B65G 57/24; B65G 59/02; B65G 59/023; B65G 59/04;
(Continued)

(56) References Cited

U.S. PATENT DOCUMENTS

| 2,841,433 | A | * | 7/1958 | Pagdin | .................. | B65G 57/04 |
| | | | | | | 294/65 |
| 3,118,554 | A | * | 1/1964 | Brainard | ................. | B66F 9/181 |
| | | | | | | 294/65 |

(Continued)

FOREIGN PATENT DOCUMENTS

| DE | 4206038 | 9/1993 |
| EP | 1445220 | 2/2004 |

(Continued)

OTHER PUBLICATIONS

Machine generated English translation of DE 42 06 038; Muller; Sep. 2, 1993.*

*Primary Examiner* — Lynn E Schwenning
(74) *Attorney, Agent, or Firm* — Tutunjian & Bitetto, P.C.

(57) ABSTRACT

The apparatus for handling layers of palletized products includes a gripping head associable to a transfer machine adapted to displace the gripping head at least along a substantially vertical direction, the gripping head being provided with:
- a support framework associable to the transfer machine,
- a substantially horizontal suction plane associated to the support framework and adapted to suction a layer (S) of palletized products (P), and
- a fall-prevention plane associated to the support framework and mobile between a rest configuration, wherein the space underlying the suction plane is clear and the suction plane is free to be arranged at contact with the upper surface of the layer (S) of products (P), and an operating configuration wherein the fall-prevention plane is arranged below the suction plane and the layer (S) of suctioned products (P).

15 Claims, 9 Drawing Sheets

(51) Int. Cl.
*B65G 47/91* (2006.01)
*B65G 57/24* (2006.01)
*B65G 61/00* (2006.01)
*B66C 1/02* (2006.01)

(58) Field of Classification Search
CPC ........ B65G 57/06; B65G 47/90; B65G 47/91; B25J 9/1697; B25J 15/0616; B25J 9/021
USPC ........ 414/799, 796.2; 294/183, 185; 901/40, 901/46, 47
See application file for complete search history.

(56) References Cited

U.S. PATENT DOCUMENTS

| | | | | |
|---|---|---|---|---|
| 3,780,884 | A * | 12/1973 | Jones | 414/793 |
| 4,603,896 | A * | 8/1986 | Vasseur | B65G 47/90 294/119.1 |
| 4,850,627 | A * | 7/1989 | Franklin | B65B 35/38 294/183 |
| 5,161,934 | A * | 11/1992 | Richardson | B66F 9/183 294/113 |
| 5,338,150 | A * | 8/1994 | Focke | B66C 1/28 294/115 |
| 5,813,713 | A * | 9/1998 | Van Den Bergh | B65G 47/91 294/2 |
| 6,003,917 | A * | 12/1999 | Tygard | B66F 9/183 294/113 |
| 6,135,704 | A * | 10/2000 | Seaberg | B66F 9/183 294/119.1 |
| 6,658,816 | B1 * | 12/2003 | Parker | B65G 57/005 414/2 |
| 6,802,688 | B1 * | 10/2004 | Andersen et al. | 414/796.2 |
| 7,481,472 | B2 * | 1/2009 | Cawley | B65G 47/91 294/2 |
| 7,537,427 | B2 * | 5/2009 | Tygard | B66C 1/427 294/81.51 |
| 7,950,896 | B2 * | 5/2011 | Scholtes | B65G 57/06 414/791.6 |
| 2006/0242785 | A1 | 11/2006 | Cawley et al. | |
| 2006/0269389 | A1 * | 11/2006 | Bolzani | 414/799 |
| 2008/0292444 | A1 * | 11/2008 | Silva | 414/744.1 |
| 2010/0014954 | A1 | 1/2010 | Henderson | |
| 2010/0129188 | A1 * | 5/2010 | Perl | 414/789.5 |
| 2013/0236285 | A1 * | 9/2013 | Maurissen | B66F 9/183 414/800 |

FOREIGN PATENT DOCUMENTS

| | | |
|---|---|---|
| EP | 1724219 | 11/2006 |
| WO | WO0064790 | 11/2000 |
| WO | WO2006088354 | 8/2006 |
| WO | WO2008068264 | 6/2008 |
| WO | WO2010097088 | 9/2010 |

* cited by examiner

APPLIANCE FOR HANDLING LAYERS OF PALLETIZED PRODUCTS

TECHNICAL FIELD

The present invention refers to an apparatus for handling layers of palletized products.

DESCRIPTION OF RELATED ART

As known, palletized loads consist in one or more goods distributed in a more or less orderly manner on a pallet to allow practical and easy movement and transport.

Most of the goods are however sold on pallets of pre-defined dimensions (preferably: 800×1200 mm pallets in the EU and 1000×1200 mm pallets in the US) arranging the products on several superimposed layers.

However, there particularly arises the need of circulating smaller number of goods in an equally practical and easy manner; regarding this, it should be observed that, especially regarding the distribution of the goods to small shops and stores, delivery more and more often consists in a few layers of products or even in one layer arranged on the pallet.

With such aim, there were devised various palletization and de-palletization systems capable of picking up the layers of palletized products, whether loose or grouped within the boxes, crates or bundles, and thus gather them again in such layers on a new pallet which can be transferred analogously to the complete palletized loads.

EP 1 187 782, for example, illustrates an apparatus for gripping layers of palletized products, which consists in a suction plane divided into a plurality of valve chambers and supporting a source of vacuum connected to the valve chambers.

The suction plane is movable vertically along a vertical guide at the base of which palletized loads to be palletized/depalletized can be arranged.

The suction plane is thus intended to be laid on the top part of the layer of palletized products and, through the vacuum force generated by the source of vacuum, grip the layer to raise it with respect to the rest of the palletized load.

Once raised, the layer of products, below the suction plane there is arranged a second pallet and/or an alternative loading plane, intended to be subsequently moved away with respect to the suction plane.

An analogous apparatus for gripping layers is illustrated in EP 1 445 220.

However, both EP 1 187 782 and EP 1 445 220, reveal some drawbacks in particular related to the difficulty of guaranteeing the required gripping force on the layer of products under all operating conditions.

Actually, for layers of palletized products distributed uniformly and/or which—due to configuration and constitution—are sufficiently impermeable to the passage of air, the suctioning plane is capable of gripping all the goods, while for layers of products distributed in an incomplete manner and/or permeable to the passage of air, the vacuum effect generated by the suctioning plane may not be sufficient, with the risk that the apparatus loses grip on the products.

The latter possibility should be considered particularly hazardous, on one hand due to the fact that it can cause the damaging and/or the breaking of the products regarding which grip has been lost, and on the other hand due to the fact that it can cause drawbacks and quite costly stop of the plant.

Regarding this, for example, it is observed that in the beverage distribution industry, the fall of even a single bale of palletized products causes considerable problems especially related to the need of removing the dirt and drying the plant and the dirty work environment, hence implying considerable use of time and personnel, with ensuing reduction of overall productivity.

The document EP 1 855 970, instead illustrates a depalletizing device provided with a gripping head which is movable between a first station and a second station bearing the palletized loads to be palletized/depalletized.

The gripping head substantially consists in a conveyor belt intended to be wedged between the layer of products arranged at the top part of the palletized load and the immediately underlying layer of products.

Analogously, document WO 2008/068264 refers to a method and a device for loading a pallet of mixed products as well as a warehouse management system. Among the various disclosures present in WO 2008/068264, the use of a particular depalletizing head capable of picking up/depositing entire layers of palletized products is indicated in particular.

Such depalletizing head is provided with two opposite horizontal bases for supporting products, which are mutually neared to each other and which can be moved away from each other on opposite sides of the layer of products to be picked up with the aim of being wedged between the layer and the underlying one.

For such purpose, a side of each horizontal base is constituted by a motorized roller which, pressed against the base of the layer of products to be picked up, causes the raising and the loading thereof on the base.

However, also documents EP 1 855 970 and WO 2008/068264 reveal some drawbacks among which the fact that the forced wedging of a conveyor belt or a motorized cylinder between the various layers of palletized products determines, at times, the damaging or the breaking of the palletized products, at least the softer and less resistant ones.

Regarding this, it should be observed that the products packaged in containers that are not perfectly integral, though not irreversibly damaged but simply dented, are conceived by the end consumer as goods of lower quality and thus less appealing for the customers.

SUMMARY OF THE INVENTION

Thus, the main aim of the present invention is to provide an apparatus for handling layers of palletized products capable of allowing picking up, transferring and depositing layers of palletized products under maximum safety conditions, without running the risk of jeopardizing the wholeness of the goods and/or encountering machine stop drawbacks, so as to guarantee a considerable increase of productivity and overall reliability of the plant.

Another object of the present invention is to provide an apparatus for handling layers of palletized products capable of allowing overcoming the aforementioned drawbacks of the prior art through a solution that is simple, rational, easy and efficient to use as well as being relatively inexpensive.

The objects outlined above are attained by the present apparatus for handling layers of palletized products, comprising a gripping head associable to a transfer machine adapted to displace said gripping head at least along a substantially vertical direction, said gripping head being provided with at least one support framework associable to said transfer machine and at least one substantially horizontal suction plane associated to said support framework and adapted to suction a layer of palletized products, characterised in that said gripping head comprises at least one fall-prevention plane associated to said support framework and mobile between a rest configuration, in which the space underlying the suction plane is clear and the suction plane is free to be arranged at contact with the upper surface of the layer of products, and an operating configuration, in which the fall-prevention plane is arranged below the suction plane and the layer of suctioned products, to prevent the products from falling during the displacement of the gripping head by the transfer machine.

BRIEF DESCRIPTION OF THE DRAWINGS

Other characteristics and advantages of the present invention will be more apparent from the description of a preferred but not exclusive embodiment of an apparatus for handling layers of palletized products, illustrated by way of non-limiting example in the attached drawings, wherein.

DETAILED DESCRIPTION OF PREFERRED EMBODIMENTS

With particular reference to such figures, an apparatus for handling layers S of palletized products P is indicated in its entirety with 1.

Regarding this, it should be observed that in the present description the term product P is used to indicate any general bale that can be transported on a pallet, which may indistinctively consist in loose goods or goods packaged in boxes, crates, cartons or bundles, distributed on several layers S loaded superimposed on a pallet B.

Figure 1:
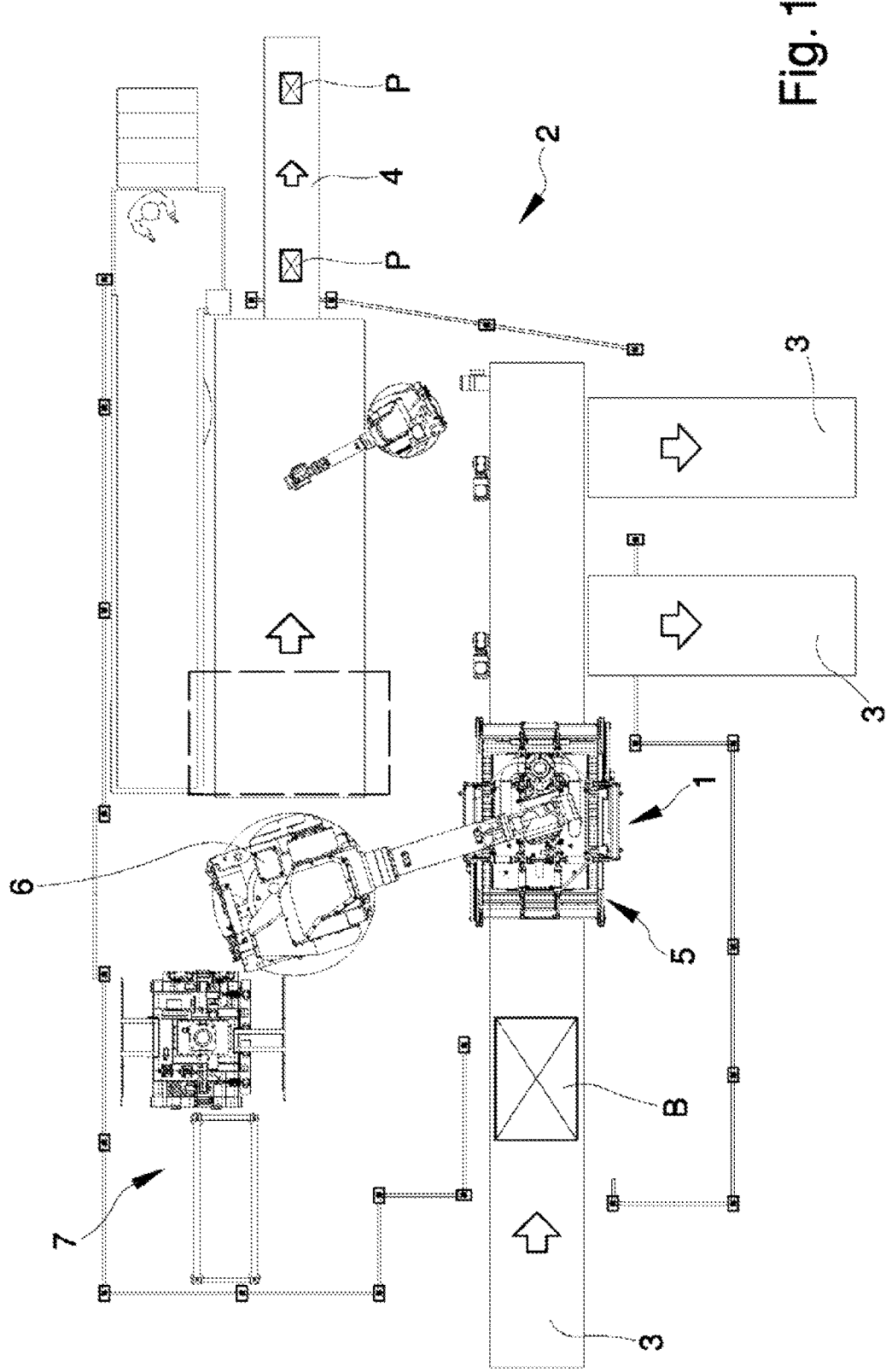
FIG. 1 is a plan view of a plant using the apparatus according to the invention.
Figure 2:
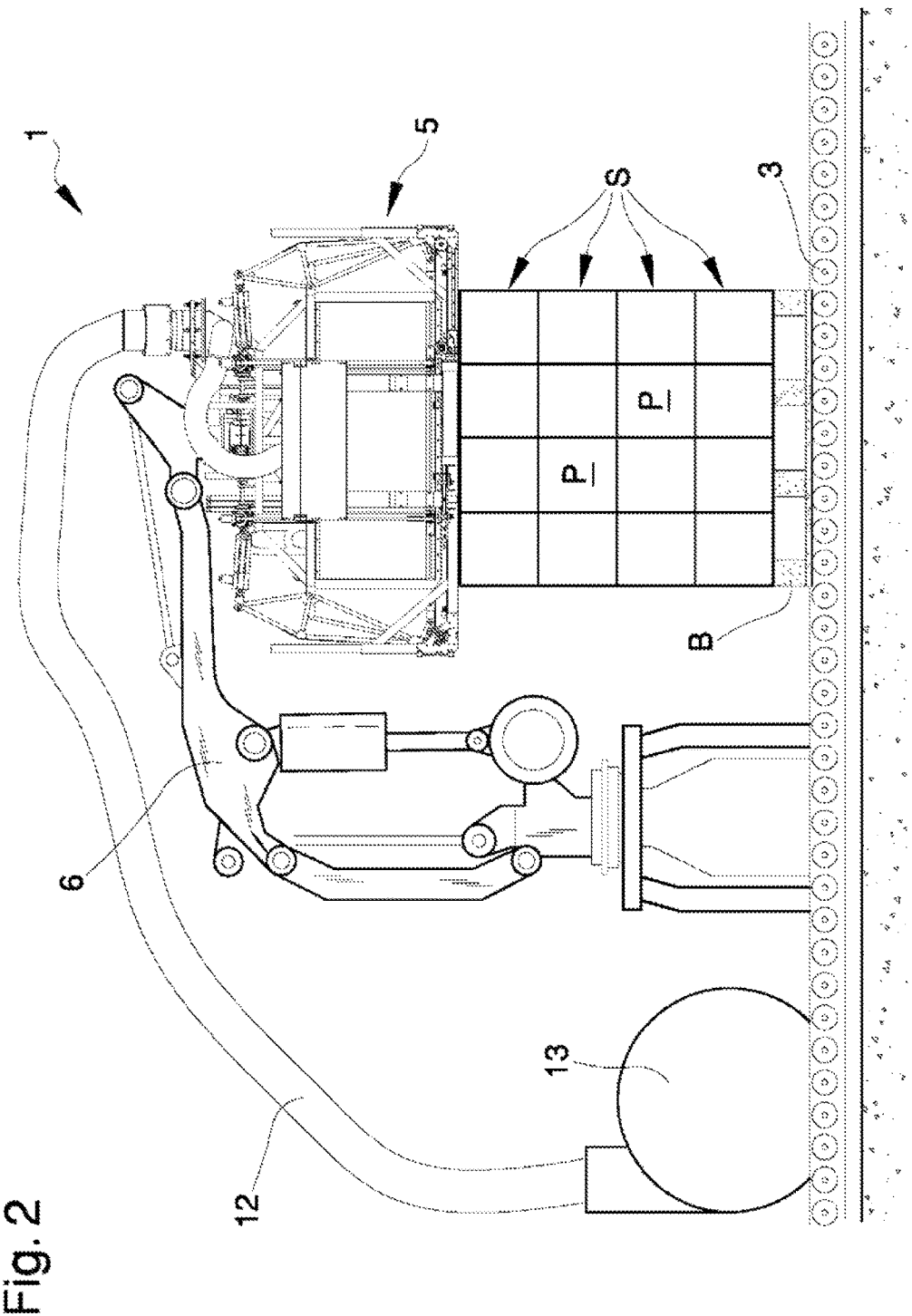
FIG. 2 is a side, schematic and partial view of the plant of FIG. 1.
Figure 3:
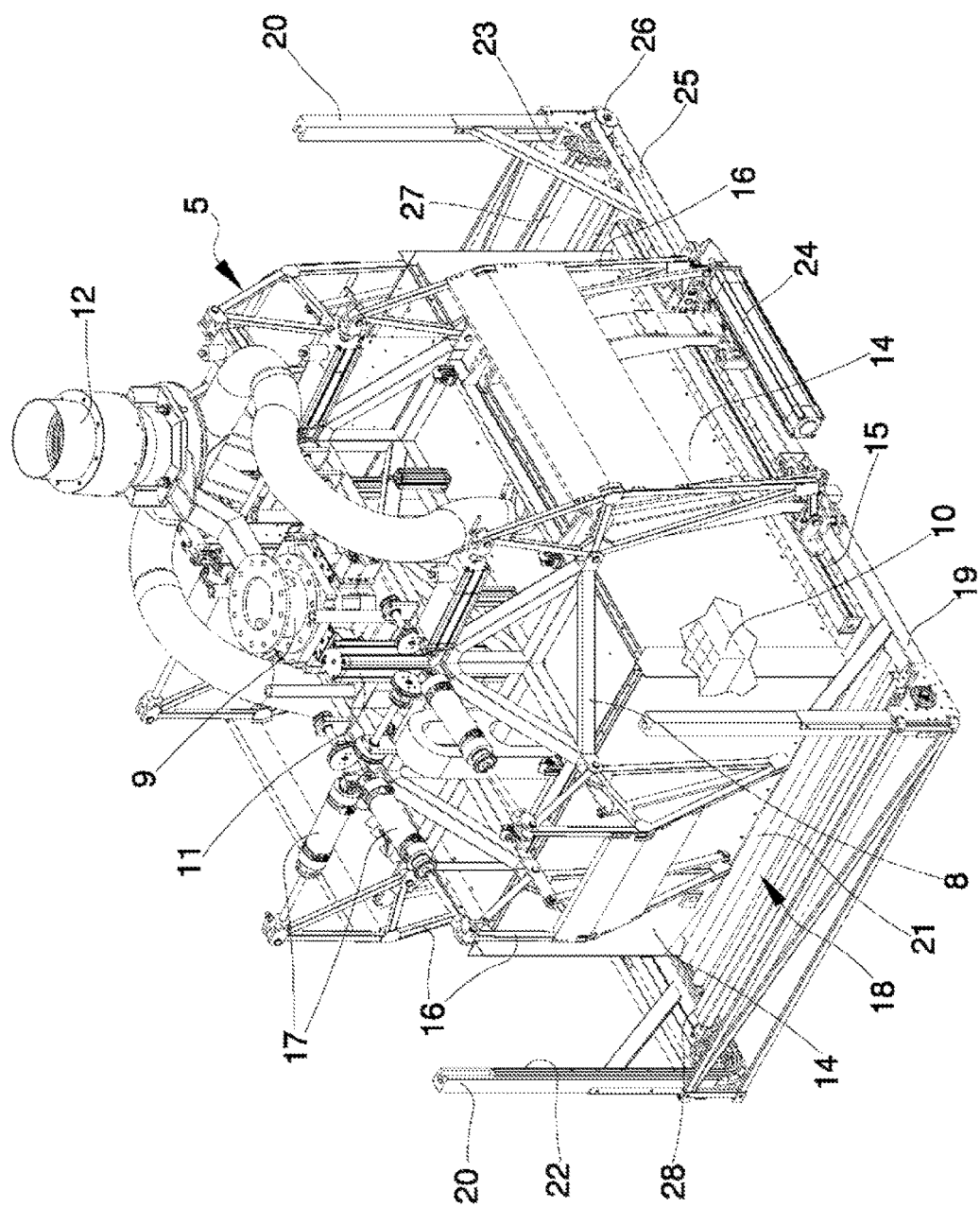
FIG. 3 is an axonometric view of the gripping head provided for by the apparatus according to the invention.
Figure 4:
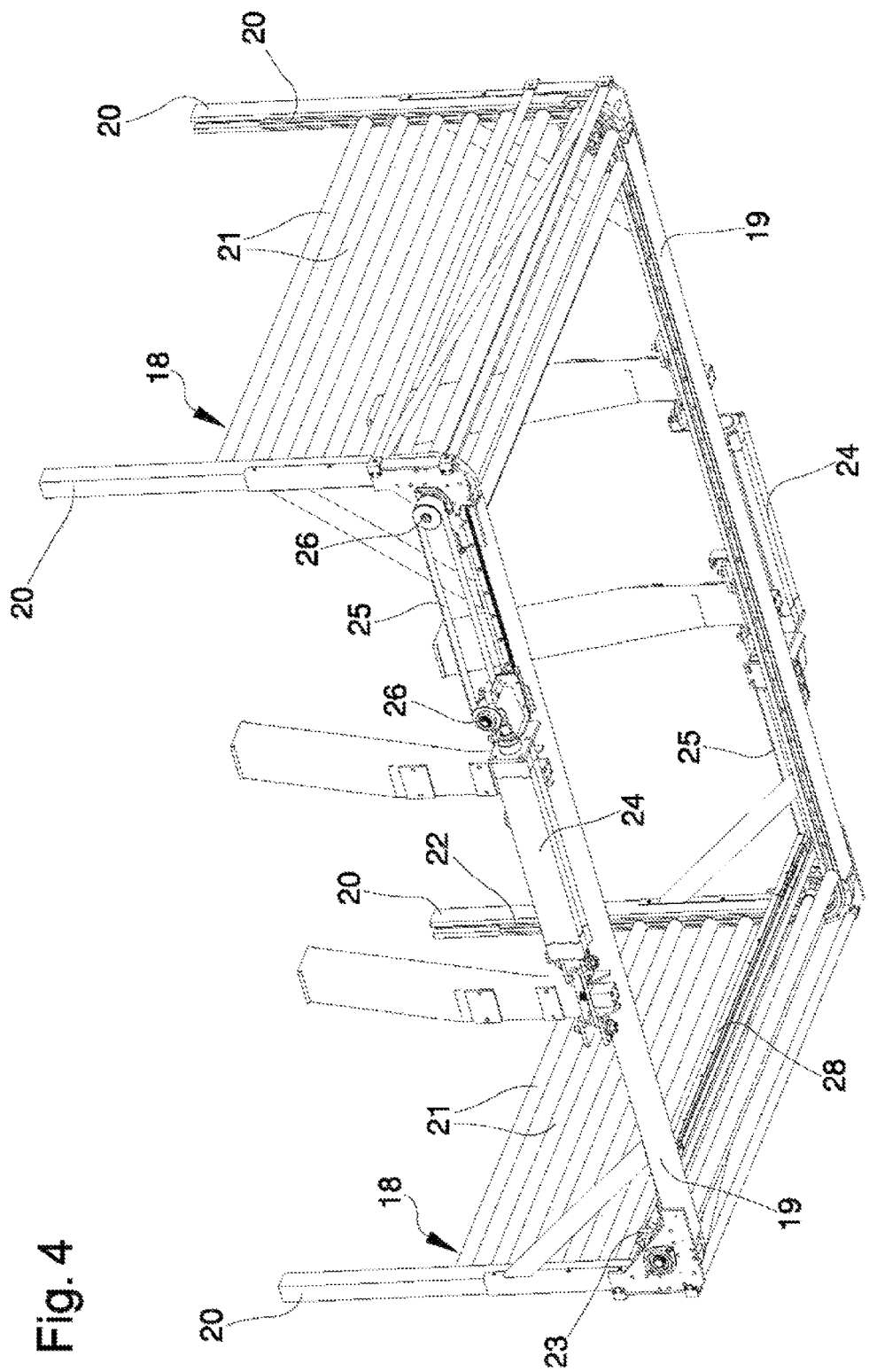
FIG. 4 is an axonometric view of a portion of the apparatus according to the invention with the fall-prevention plane in rest configuration.
Figure 5:
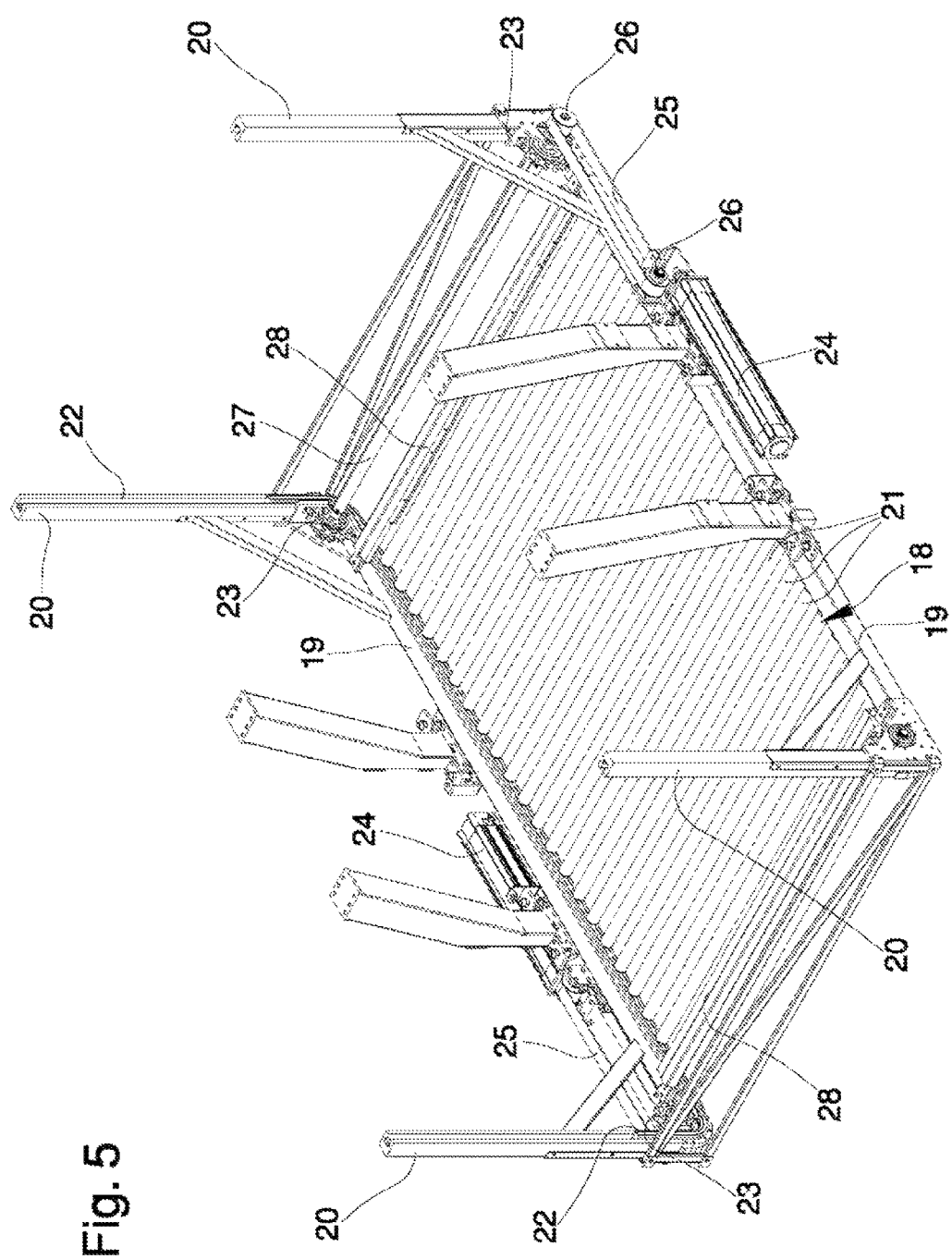
FIG. 5 is an axonometric view of a portion of the apparatus according to the invention with the fall-prevention plane in operative configuration.

The apparatus 1 is intended, for example, to be used in a palletizing/depalletizing plant 2 (FIG. 1), provided with a line for advancing 3, nearing and moving away the pallets B bearing the products P and a line 4 for separating the de-palletized products P.

However, the apparatus 1 can also be used in different types of plants 2, for example without a separation line 4 or the like.

Advantageously, the apparatus 1 comprises a gripping head 5 associable to a transfer machine 6 adapted to displace the gripping head 5 at least along a substantially vertical direction.

In particular, the transfer machine 6 is a four or five axes anthropomorphic robot adapted to cooperate with the advancement line 3, with the separation line 4 and, possibly, with head-holder storage means 7 which houses the gripping heads 5 which are required for the normal operation of the plant 2.

The gripping head 5 is provided with a support framework 8 provided with engagement means 9 for coupling to the transfer machine 6.

A horizontal suction plane 10 which is dimensioned slightly larger than the standard pallet (for example an EU pallet) is associated to the support framework 8 and it is adapted to suction the upper layer S of the palletized products P, i.e. the one arranged at the top part of the palletized load. The suction plane 10 is mounted on the support framework 8 adjustable height-wise by means of special actuator cylinders 11 and, by interposing a flexible tubular conduit 12, it is associated to a suctioning source 13, of the centrifugal fan type, which is mounted on the ground in proximity of the transfer machine 6.

However, instead of being on the ground, the suctioning source 13 can be mounted directly on the gripping head 5.

Along the entire perimeter of the suction plane there is distributed at least one flexible curtain element 14 which, during use, is intended to wrap the lateral walls of the products P to guarantee the suction vacuum for gripping the layer S.

More in detail, the gripping head 5 has four flexible curtain elements 14, one for each side of the suction plane 10, made of silicone, rubber or any other material.

In practice, the flexible curtain elements 14 are intended to adhere to the lateral walls of the products 5 to reduce the air passage sections during suctioning by the suction plane 10 and delimit an airtight environment in which the vacuum conditions required to obtain a firm gripping of the products P can be obtained easily.

The flexible curtain elements 14 can be adjusted to adapt to the various dimensions of the layers S.

In other words, each flexible curtain element 14 is hooked to a series of windable raising cords, not illustrated in the figures, which allow "shortening" and "extending" the flexible curtain elements 14 depending on the height of the products P and the distance between the products P and the flexible curtain elements 14.

Actually, during suctioning the flexible curtain elements 14 are suctioned against the lateral walls of the products P and pushed to adhere by the vacuum generated by the suction plane 10.

When the horizontal dimensions of the layers S are rather small, thus, the lateral walls of the products P are more spaced from the edges of the pallet B and the space the flexible curtain elements 14 are required to travel for adherence is considerably greater with respect to when, instead, the layers S have greater horizontal dimensions.

In these circumstances, the raising cords allow ensuring the required contact between the flexible curtain elements 14 and the lateral walls of the products P under any operating condition.

For each flexible curtain element 14 there are provided for pressure means 15, 16, 17 adapted to push towards the internal of the flexible curtain element 14 for at least partial adhesion thereof to the lateral walls of the layer S of products P.

Advantageously, the pressure means 15, 16, 17 consist in a substantially horizontal bar 15, which can be approached or moved away with respect to the corresponding flexible curtain element 14 through a system of rocker levers 16 actuated by a series of automatic actuators 17.

The use of pressure means 15, 16, 17 like the ones described and illustrated in the figures advantageously allows adhering the flexible curtain elements 14 to the products P by means of a particularly simple and inexpensive technical solution.

Advantageously, the gripping head 5 comprises at least one fall-prevention plane 18 associated to the support framework 8 and mobile between a rest configuration, in which the space underlying the suction plane 10 is clear and the suction plane 10 is free to be arranged at contact with the upper surface of the layer S arranged at the top part of the palletized load, and an operating configuration, in which the fall-prevention plane 18 is arranged below the suction plane 10 and the layer S of suctioned products P, to prevent the products P from falling during the displacement of the gripping head 5 by the transfer machine 6.

In the particular embodiment of the gripping head 5 illustrated in the figures, the fall-prevention planes 18 are two and arranged opposite to each other.

The fall-prevention planes 18 are associated to a guide structure 19, 20 rigidly mounted on the support framework 8 and adapted to guide the fall-prevention planes 18 between a substantially vertical lateral position in the rest configuration and a horizontal position in the operative configuration.

The guide structure 19, 20 is defined by:
- a pair of horizontal tracks 19, which are arranged at the base of the gripping head 5, i.e. they define a lower surface; and
- two pairs of substantially vertical lateral tracks 20, which are associated to the horizontal tracks 19 and are arranged on two opposite sides of the gripping head 5, i.e. a pair is arranged on one side of the gripping head 5 and associated to one end of the horizontal tracks 19, while the other pair is arranged on the side of the gripping head 5 and it is associated to the opposite ends of the horizontal tracks 19.

Each fall-prevention plane 18 is defined by a plurality of rollers 21 whose ends are associated to two flexible members 22 sliding along the guide structure 19, 20.

The flexible members 22, for example, are constituted by a chain or the like.

Advantageously, the rollers 21 are associated to the flexible members 22 rotatably idle around the axis thereof.

However, alternative embodiments in which the rollers 21 are not rotatable, or in which the rotation of the rollers 21 is motorised, or in which the fall-prevention planes 18 are not defined by a succession of rollers 21 but by a shutter, for example of the roller shutter type, louver type or of the type defined by a plate or flexible strip.

Regarding this, it should be observed that the particular solution of providing for fall planes 18 constituted by a flexible strip allows, in operative configuration, to further reduce the air passage sections and attain a greater degree of vacuum, with the possibility of reducing the power absorbed by the suctioning source 13 and, hence, allowing saving energy.

The gripping head 5 also comprises an actuation system intended to actuate the sliding of the fall-prevention planes 18 along the guide structure 19, 20.

The actuation system comprises, for example, a series of gears 23 meshing with the chains 22 and actuation means 24, 25, 26 for the rotation of the gears 23.

In the particular embodiment illustrated in the figures, for each fall-prevention plane 18 the actuation means 24, 25, 26 consist in a linear actuator 24 provided with a fixed end mounted on the guide structure 19, 20 and a movable end which is associated to a belt 25 loop closed and wound around two rotatable sprockets 26.

One of the sprockets 26 is keyed to a transmission shaft 27 bearing the gears 23, so that the actuation of the linear actuator 24 drives the belt 25 around the rotatable sprockets 26 and also with the gears 23 therewith.

The linear actuators 24 are set for sliding the fall-prevention planes 18 along the horizontal tracks 19 in the opposite direction.

The gripping head 5 is also provided with sensor means 28 adapted to detect the presence of possible obstacles along the path of the fall-prevention planes 18 and to allow the passage from the rest configuration to the operative configuration only if the path is clear and free from obstacles.

Figure 8:
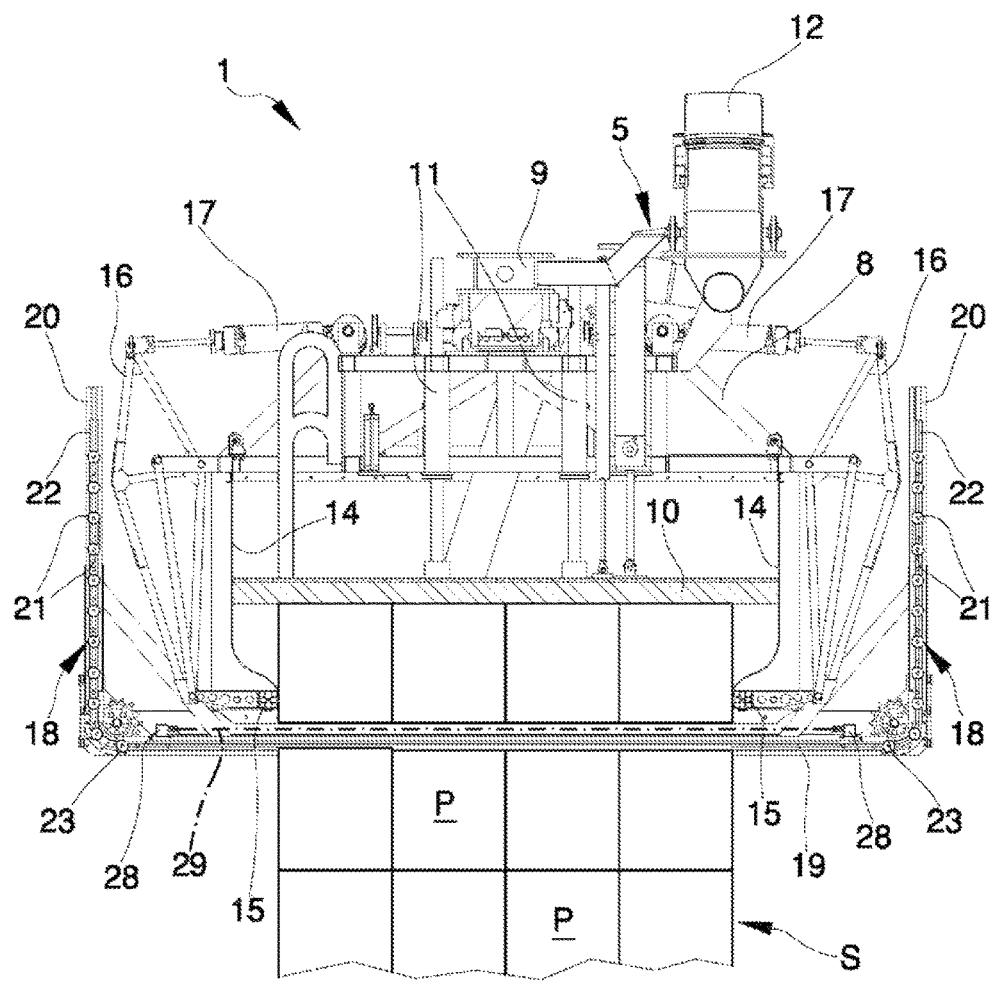

The sensor means 28, in particular, comprise a series of photocell sensors associated to the guide structure 19, 20 substantially at the height of the horizontal tracks 19; more in detail, the photocell sensors 28 define a field of detection 29 arranged immediately above the horizontal tracks 19 (FIG. 8).

Figure 6:
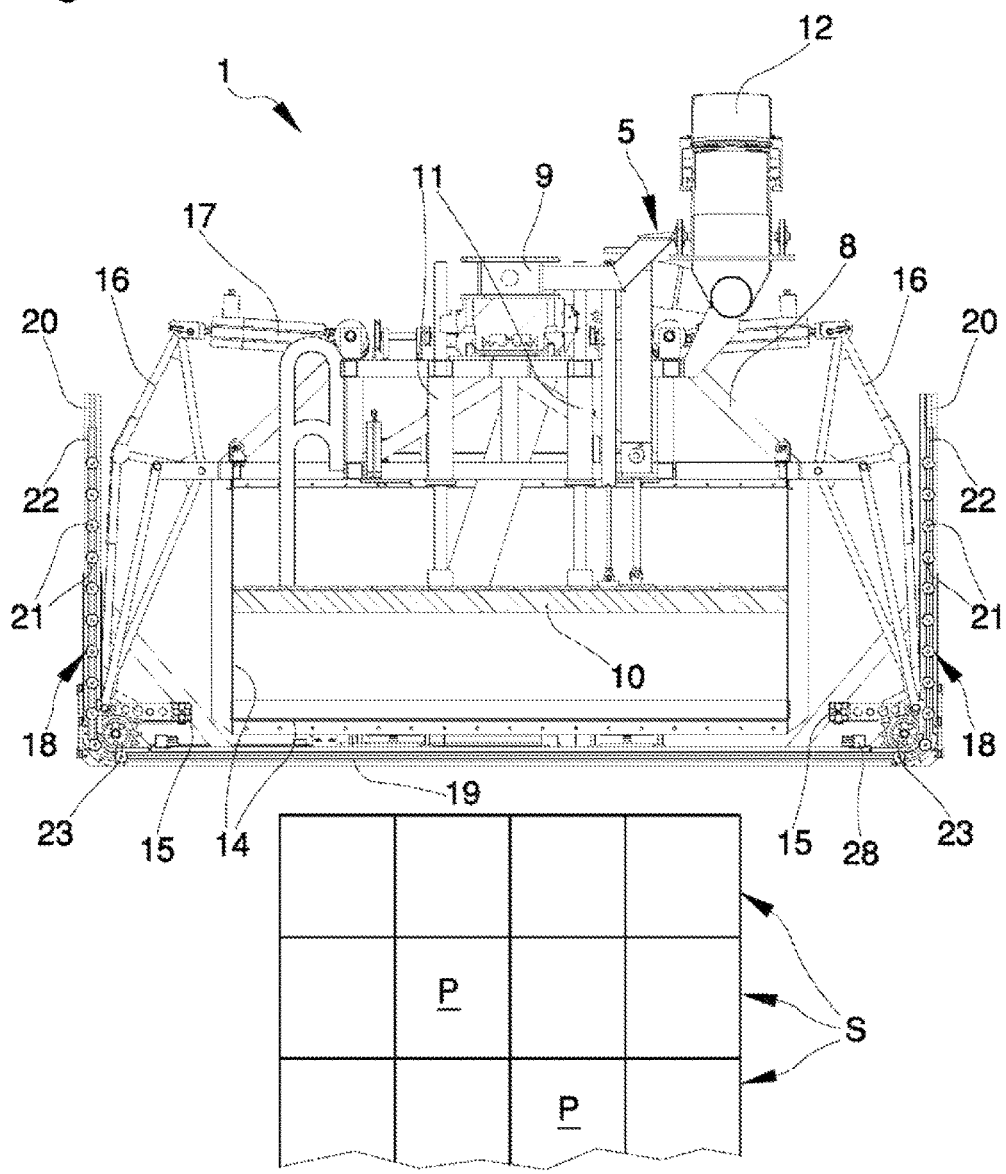
FIGS. 6 to 9 illustrate, in a succession of cross-sectional views, the operation of the gripping head provided for by the apparatus according to the invention.

The operation of the present invention is illustrated in FIGS. 6 to 9 and it is as follows. In order to pick up a layer S from the palletized load, the gripping head 5 initially has the fall-prevention planes 18 in rest configuration (FIG. 6).

Figure 7:
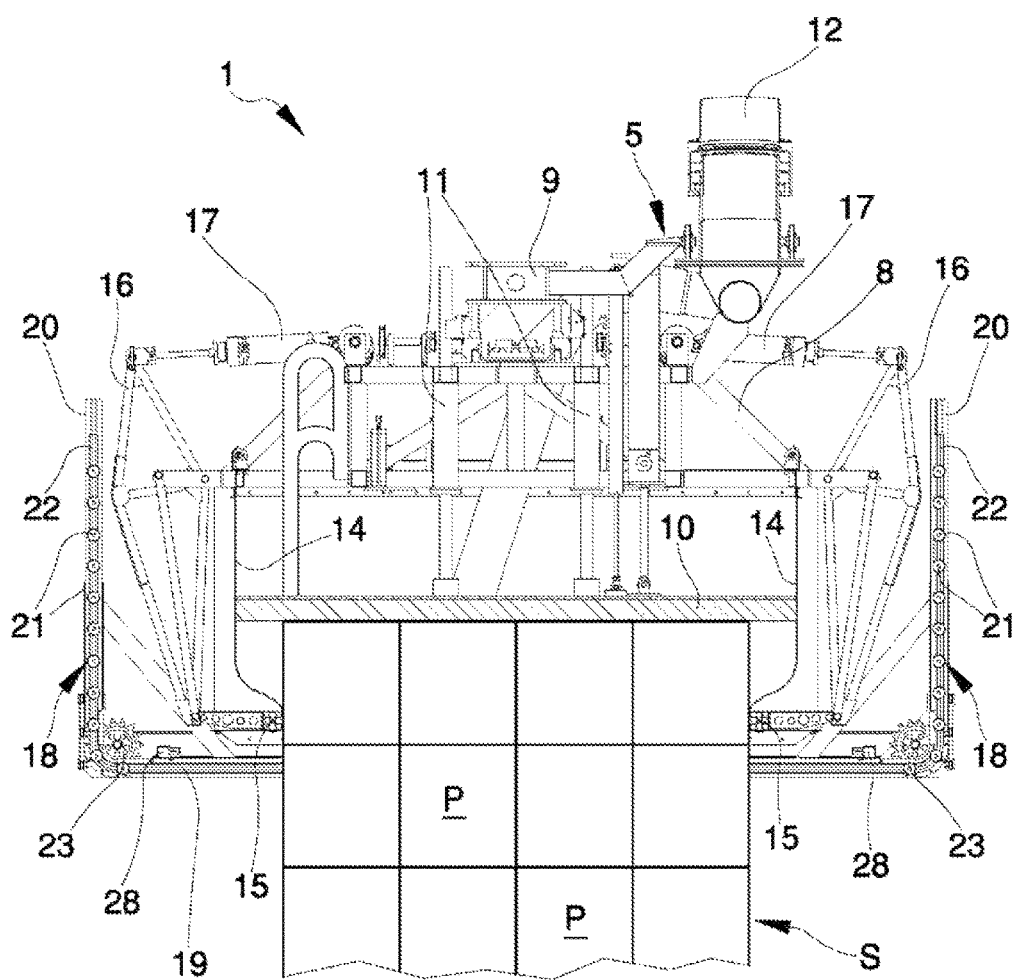

In this step, the transfer machine 6 positions the gripping head 5 above the palletized load, until it rests the suction plane 10 on the upper surface of the layer S to be picked up, and the pressure means 15, 16, 17 push the flexible curtain elements 14 at contact with the lateral walls of the products P (FIG. 7).

The distance of the suction plane 10 with respect to the horizontal tracks 19 of the guide structure 19, 20 is set depending on the height of the products P so that, in the position achieved and illustrated in FIG. 7, the lower surface of the layer S to be picked up is entirely above the field of detection 29 of the photocell sensors 28.

Due to the suctioning force released by the centrifugal fan 13, the layer S of the products P adheres to the suction plane 10 and it can be raised together with the gripping head 5 due to the actuation of the transfer machine 6 (FIG. 8).

After the gripping head 5 is raised by a few centimeters, the apparatus 1 checks the correct loading of the products P through the sensor means 28.

In cases where not all the products P were raised correctly and some of them were left resting on the palletized load, the photocell sensors 28 detect the presence of such products P in the field of detection 29 and, from such circumstance, the apparatus 1 is capable of detecting the erroneous raising of the layer S and repeat the gripping operation returning to the position illustrated in FIG. 7.

Figure 9:
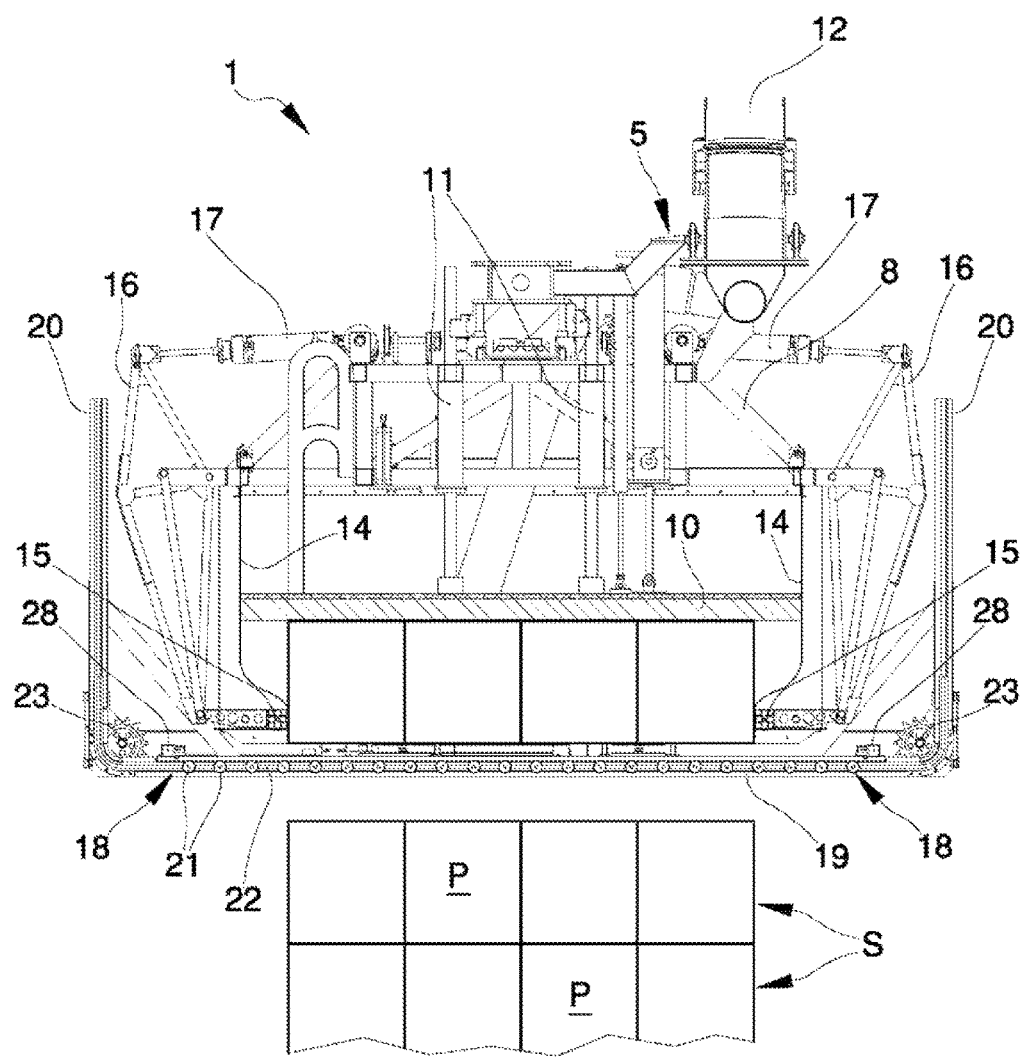

On the contrary, should all the products P be raised correctly, the field of detection 29 is clear of obstacles and the fall-prevention planes 18 can be moved from the rest configuration to the operative configuration due to the actuation of the linear actuators 24 (FIG. 9).

In this configuration, the gripping head 5 can be moved by the transfer machine 6 under maximum safety conditions and in a particularly quick and accurate manner without running the risk of losing grip on the layer S, given that even should such event occur the products P would end up resting on the fall-prevention planes 18 without jeopardizing soundness thereof.

Regarding this, it should be observed that the particular solution of providing fall-prevention planes 18 constituted by rollers 21 rotatable around the axis thereof allows facilitating the release of the products P even should the latter end up on the rollers 21.

Actually, in this case once the gripping head 5 is arranged a few centimeters above the releasing point and the horizontal sliding of the fall-prevention planes 18 is actuated, the rollers 21 can roll beneath the products P without dragging them with therewith, with the result of dropping the layer S directly on the release point from such a low height not to run any risk of breaking or damaging the products P.

It has thus been observed how the described invention achieves the proposed objects.

The invention claimed is:

1. An apparatus for handling layers of palletized products, comprising:
   a gripping head associable to a transfer machine adapted to displace said gripping head at least along a substantially vertical direction, said gripping head being provided with at least one support framework associable to said transfer machine and at least one substantially horizontal suction plane associated to said support framework and adapted to suction a layer (S) of palletized products (P),
   wherein said gripping head comprises at least one fall-prevention plane associated to said support framework and mobile between a rest configuration, wherein the space underlying the suction plane is clear and the suction plane is free to be arranged at contact with the upper surface of the layer (S) of products (P), and an operating configuration, wherein the fall-prevention plane is arranged below the suction plane and the layer (S) of suctioned products (P), to prevent the products (P) from falling during the displacement of the gripping head by the transfer machine,
   wherein said gripping head comprises one flexible curtain element along each side of said suction plane and a plurality of substantially horizontal bars adapted to push each of said flexible curtain elements inwards for at least partial adhesion thereof to the lateral walls of said layer (S) of products (P), wherein each horizontal bar is moved towards or away from said flexible curtain element through a system of rocker levers actuated by automatic actuators,
   wherein each flexible curtain element hangs freely from a respective side of said suction plane in such a manner that each flexible curtain element is separated from said plurality of substantially horizontal bars and is adapted to be able to be shortened or extended depending on the height of the products (P) and the distance between the products (P) and said flexible curtain elements,
   wherein each flexible curtain element is oriented between the lateral wall of the layer (S) of products (P) and said plurality of substantially horizontal bars,
   wherein each horizontal bar is affixed to a distal end of each of said rocker levers, and
   wherein, when said gripping head is being displaced by the transfer machine to move a layer (S) of products (P), and when said suction plane is suctioning said layer (S) of product (P), each horizontal bar is moved towards said flexible curtain element by its associated rocker lever and pushes on each flexible curtain element on each side of said suction plane to cause said at least partial adhesion of each flexible curtain element to each lateral wall of said layer (S) of product (P) so as to guarantee the suction vacuum for gripping the layer (S).

2. The apparatus according to claim 1, wherein said fall-prevention plane is associated to a guide structure mounted on said support framework and adapted to guide said fall-prevention plane between a substantially vertical lateral position in said rest configuration and a horizontal position in said operative configuration.

3. The apparatus according to claim 2, wherein said guide structure comprises at least one pair of horizontal tracks arranged at the base of said gripping head, and at least one pair of substantially vertical lateral tracks, associated to said horizontal tracks and arranged on a side of said gripping head.

4. The apparatus according to claim 2, wherein said fall-prevention plane comprises a plurality of rollers whose ends are associated to two flexible members sliding along said guide structure.

5. The apparatus according to claim 4, wherein said rollers are rotatably associated to said flexible members around the axis thereof.

6. The apparatus according to claim 2, wherein said gripping head comprises at least one system for actuating the sliding of said fall-prevention plane along said guide structure.

7. The apparatus according to claim 6, wherein said actuation system comprises at least one gear meshing with at least one of said flexible members and actuation means for the rotation of said gear.

8. The apparatus according to claim 2, wherein said guide structure comprises two of said pairs of lateral tracks arranged on opposite sides of said gripping head.

9. The apparatus according to claim 1, wherein said gripping head comprises two of said fall-prevention planes arranged opposite to each other.

10. The apparatus according to claim 1, wherein said gripping head comprises sensor means adapted to detect the presence of possible obstacles along the path of said fall-prevention plane and to allow the passage from said rest configuration to said operative configuration only if said path is clear.

11. The apparatus according to claim 10, wherein said sensor means comprise a series of sensors associated to said guide structure substantially at the height of said horizontal tracks.

12. The apparatus according to claim 1, wherein said flexible curtain element can be adjusted to adapt to the dimensions of said layers (S).

13. The apparatus according to claim 1, further comprising at least one suctioning source mounted on the ground and associated to said suction plane for interposing a flexible tubular conduit.

14. The apparatus according to claim 1, wherein said support framework comprises engagement means for coupling to said transfer machine, said transfer machine being an anthropomorphic robot adapted to cooperate with at least one of a line for advancing pallets (B) bearing said products (P) and a line for separating said products (P).

15. An apparatus for handling layers of palletized products, comprising:
   a gripping head associable to a transfer machine adapted to displace said gripping head at least along a substantially vertical direction, said gripping head being provided with at least one support framework associable to said transfer machine and at least one substantially horizontal suction plane having four sides and associated to said support framework and adapted to suction a layer (S) of palletized products (P),
   wherein said gripping head comprises at least one fall-prevention plane associated to said support framework and mobile between a rest configuration, wherein the space underlying the suction plane is clear and the suction plane is free to be arranged at contact with the upper surface of the layer (S) of products (P), and an operating configuration, wherein the fall-prevention plane is arranged below the suction plane and the layer (S) of suctioned products (P), to prevent the products (P) from falling during the displacement of the gripping head by the transfer machine, wherein said gripping head comprises a single flexible curtain element distributed along each of the four sides of said suction plane, and a plurality of substantially horizontal bars adapted to push each flexible curtain element inwards for at least partial adhesion thereof to the lateral walls of said layer (S) of products (P), wherein each horizontal bar is moved towards or away from said flexible curtain element through a system of rocker levers actuated by automatic actuators, wherein each flexible curtain element hangs freely from a respective side of said suction plane in such a manner that each flexible curtain element is separated from said plurality of substantially horizontal bars and is adapted to be able to be shortened or extended depending on the height of the products (P) and the distance between the products (P) and said flexible curtain elements, wherein each flexible curtain element is oriented between the lateral wall of the layer (S) of products (P) and said plurality of substantially horizontal bars, wherein each horizontal bar is affixed to a distal end of each of said rocker levers, and wherein, when said gripping head is being displaced by the transfer machine to move a layer (S) of products (P), and when said suction plane is suctioning said layer (S) of product (P), each horizontal bar is moved towards said flexible curtain element by its associated rocker lever and pushes on each flexible curtain element on each side of said suction lane to cause said at least partial adhesion of each flexible curtain element to each lateral wall of said layer (S) of product (P) so as to guarantee the suction vacuum for gripping the layer (S).

* * * * *